United States Patent [19]

Martin et al.

[11] 3,860,632
[45] Jan. 14, 1975

[54] N-O-NITROPHENYLPROPARGYL-CARBAMATE

[75] Inventors: Henry Martin, Basel, Switzerland; Georg Pissiotas, Loerrach, Germany; Otto Rohr, Therwil, Switzerland

[73] Assignee: Ciba-Geigy AG, Basel, Switzerland

[22] Filed: Jan. 2, 1974

[21] Appl. No.: 430,284

Related U.S. Application Data

[62] Division of Ser. No. 69,887, Sept. 4, 1970, Pat. No. 3,800,037.

[30] Foreign Application Priority Data

Sept. 4, 1969 Switzerland.................. 13420/69

[52] U.S. Cl............................. 260/471 C, 424/300
[51] Int. Cl............................................ C07c 125/06
[58] Field of Search................................ 260/471 C

[56] References Cited
UNITED STATES PATENTS 3,770,695  11/1973  Nyquist et al.................. 260/471 C Primary Examiner—Lorraine A. Weinberger
Assistant Examiner—L. A. Thaxton
Attorney, Agent, or Firm—Harry Falber; Frederick H. Rabin

[57] ABSTRACT

Substituted carbanilic acid propargyl esters of the formula

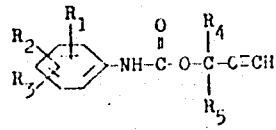

in which $R_1$, $R_2$ and $R_3$, which may be the same or different, each represents a hydrogen atom or a halogen atom or an alkyl, alkoxy or halogenalkyl radical each having from 1 to 4 carbon atoms or a $-NO_2$ or $-SCN$ group, and $R_4$ and $R_5$, which may be the same or different, each represents a hydrogen atom or an alkyl group having from 1 to 4 carbon atoms, as synergistic agents for insecticidally and/or a acaricidally active substances.

1 Claim, No Drawings

N-O-NITROPHENYLPROPARGYL-CARBAMATE

This is a division of application Ser. No. 69,887, filed on Sept. 4, 1970, now U.S. Pat. No. 3,800,037.

This invention relates to substituted carbanilic acid propargyl esters which may be used as synergistic agents for insecticidally and/or acaricidally active substances, and to preparations which in addition to insecticidal or acaricidal substances contain such carbanilic acid propargyl esters.

The compounds which are used as synergistic agents according to the present invention have the formula

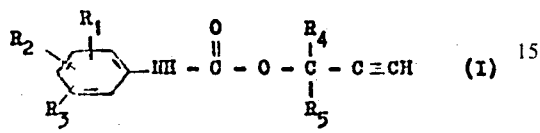

in which $R_1$, $R_2$ and $R_3$, which may be the same or different, each represents a hydrogen atom or a halogen atom or an alkyl, alkoxy or halogenalkyl radical each having from 1 to 4 carbon atoms or a —$NO_2$ or —SCN group, and $R_4$ and $R_5$, which may be the same or different, each represents a hydrogen atom or an alkyl group having from 1 to 4 carbon atoms.

The alkyl and alkoxy groups which are represented by $R_1$, $R_2$, $R_3$, $R_4$ and $R_5$, may be substituted or unsubstituted, branched or straight-chained. Suitable alkyl and alkoxy groups are, for example, methyl, ethyl and methoxy groups.

Compounds of special importance are those of the formulae

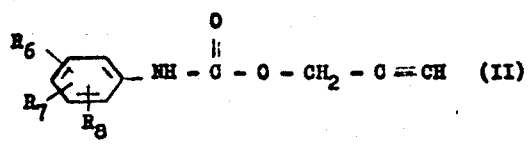

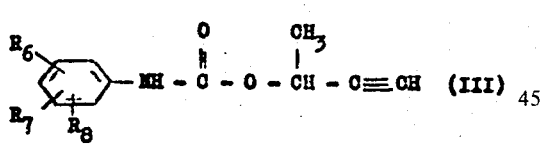

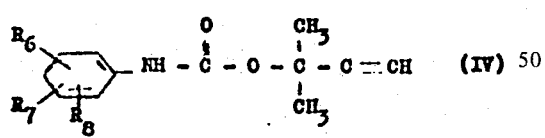

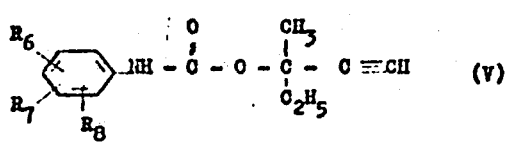

in each of which $R_6$, $R_7$ and $R_8$, which may be the same or different, each represents a hydrogen, fluorine, chlorine or bromine atom or a methyl, methoxy, —$CF_3$. —$NO_2$ or —SCN group.

An especially suitable compound is that of the formula

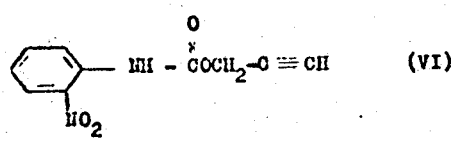

This compound is new and therefore also forms a subject of the invention.

The compounds of the formula I may be prepared according to methods which are, in themselves, known, for example, by the reaction of an isocyanate of the formula

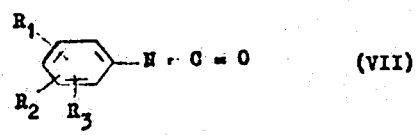

with an alcohol of the formula

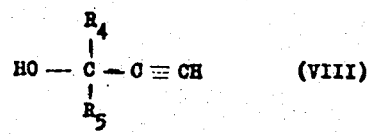

in an inert solvent, for example, benzene, petroleum ether or dimethylformamide, the substituents $R_1$, $R_2$, $R_3$, $R_4$ and $R_5$ having the same meanings as those specified for formula I.

The compounds defined by the general formula I are capable of increasing the activity of insecticidal and/or acaricidal compounds many-fold (synergism). Surprisingly, it has also been found that when using compounds of the formula I, insects or representatives of the order Acarina, which are resistant to carbamates or phosphoric acid esters, can be rendered completely sensitive to these latter compounds. Suitable insecticidally or acaricidally active substances are, for example, the following compounds:

PHOSPHORIC ACID DERIVATIVES

Bis-0,0-diethylphosphoric acaid anhydride (TEPP)
0,0,0,0-Tetrapropyldithiopyrophosphate
Dimethyl(2,2,2-trichloro-1-hydroxyethyl)phosphonate (TRICHRORFON)
1,2-Dibromo-1,2-dichlorothyldimethylphosphate (NALED)
2,2-Dichlorovinyldimethylphosphate (DICHLORFOS)
2-Methoxycarbamyl-1-methylvinyldimethylphosphate (MEVINPHOS)
Dimethyl-1-methyl-2-(methylcaroamoyl)vinylphosphate cis (MONOCROTOPHOS)
3-(Dimethoxyphosphinyloxy)-N-methyl-N-methoxy-cis-croton-amide
3-(Dimethoxyphosphinyloxy)-N,N-dimethyl-cis-crotonamide (DICROTOPHOS)
2-Chloro-2-diethylcarbamoyl-1-methylvinyldimethylphosphate (PHOSPHAMIDON)
0,0-Diethyl-0-2-(ethylthio)-ethylthiophosphate (DEMETON)
0,0-Diethyl-S-2-(ethylthio)-ethylthiophosphate
S-Ethylthioethyl-0,0-dimethyl-dithiophosphate (THIOMETON)
0,0-Diethyl-S-ethylmercaptomethyldithiophosphate (PHORATE)

0,0-Diethyl-S-2-[(ethylthio)ethyl]dithiophosphate (DISULFOTON)
0,0-Dimethyl-S-2-(ethylsulphinyl)ethylthiophosphate (OXYDEMETONMETHYL)
0,0-Dimethyl-S-(1,2-dicarbethoxyethyl)dithiophosphate (MALATHION)
(0,0,0,0-Tetraethyl-S,S'-methylene-bis-[dithiophosphate] (ETHION)
0-Ethyl-S,S-dipropyldithiophosphate
0,0-Dimethyl-S-(N-methyl-N-formylcarbamoylmethyl)-dithiophosphate (FORMOTION)
S-N-(1-Cyano-1-methylethyl)carbamoylmethyldiethylthiolphosphate (CYANTHOAT)
S-(2-Acetamidoethyl)-0,0-dimethyldithiophosphate
Hexamethylphosphoric acid triamide (HEMPA)
0,0-Dimethyl-0-p-nitrophenylthiophosphate (PARATHION-METHYL)
0,0-Diethyl-0-p-nitrophenylthiophosphate (PARATHION)
0-Ethyl-0-p-nitrophenylthiophosphonate (EPN)
0,0-Dimethyl-0-(4-nitro-m-tolyl)thiophosphate (FENITROTHION)
0,0-Dimethyl-0-(2-chloro-4-nitrophenyl)thiophosphate (DICAPTHON)
0,0-Dimethyl-0-p-cyanophenylthiophosphate (CYANOX)
0-Ethyl-0-p-cyanophenylphenylthiophosphonate
0,0-Diethyl-0-2,4-dichlorophenylthiophosphate (DICHROFENTHION)
0-2,4-Dichlorophenyl-0-methylisopropylamidothiophosphate
0,0-Dimethyl-0-2,4,5-trichlorophenylthiophosphate (RONNEL)
0-Ethyl-0-2,4,5-trichlorophenylethylthiophosphonate (TRICHLORONAT)
0,0-Dimethyl-0-2,5-dichloro-4-bromophenylthiophosphate (BROMOPHOS)
0,0-Diethyl-0-2,5-dichloro-4-bromophenylthiophosphate (BROMOPHOS-ETHYL)
4-tert. Butyl-2-chlorophenyl-N-methyl-0-methylamidophosphate (CRUFOMAT)
Dimethyl-p-(methylthio)phenylphosphate
0,0-Dimethyl-0-(3-methyl-4-methylmercaptophenyl)thiophosphate (FENTHION)
Isopropylamino-0-ethyl-0-(4-Methylmercapto-3-methylphenyl)phosphate
0,0-Diethyl-0-p-[(methylsulphinyl)phenyl]-thiophosphate (FENSULFOTHION)
0,0-Dimethyl-0-p-sulphamidophenylthiophosphate
0-[p-(Dimethylsulphamido)phenyl]0,0-dimethylthiophosphate (FAMPHUR)
0,0,0',0'-Tetramethyl-0,0'-thiodi-p-phenylenethiophosphate
0-(p-(p-Chlorophenylazophenyl)0,0-dimethylthiophosphate (AZOTHOAT)
0-Ethyl-S-phenyl-ethyldithiophosphonate
0-Ethyl-S-4-chlorophenyl-ethyldithiophosphonate
0-Isobutyl-S-p-chlorophenyl-ethyldithiophosphonate
0,0-Dimethyl-S-p-chlorophenylthiophosphate
0,0-Dimethyl-S-(p-chlorophenylthiomethyl)-dithiophosphate
0,0-Diethyl-p-chlorophenylmercaptomethyl-dithiophosphate (CARBOPHENOTHION)
0,0-Diethyl-S-p-chlorophenylthiomethyl-thiophosphate
0,0-Dimethyl-S-(carbethoxy-phenylmethyl)dithiophosphate (PHENOTHOAT)
0,0-Diethyl-S-(carbofluorethoxy-phenylmethyl)-dithiophosphate
0,0-Dimethyl-S-(carbisopropoxy-phenylmethyl)-dithiophosphate
0,0-Dimethyl-0-(alpha-methylbenzyl-3-hydroxy-crotonyl)phosphate,
2-Chloro-1-(2,4-dichlorophenyl)vinyl-diethylphosphate (CHLORFENVINPHOS)
2-Chloro-1-(2,4,5-trichlorophenyl)vinyl-dimethylphosphate
0-(2-Chloro-1-(2,5-dichlorophenyl)vinyl)-0,0-diethylthiophosphate
Phenylglyoxylonitriloxime-0,0-diethylthiophosphate (PHOXIM)
0,0-Diethyl-0-(3-chloro-4-methyl-2-oxo-2-H-1-benzopyran-7-yl)-thiophosphate (COUMAPHOS)
0,0-Diethyl-7-hydroxy-3,4-tetramethylene-coumarinyl-thiophosphate (COUMITHOAT)
2,3-p-Dioxanedithiol-S,S-bis(0,0-diethyldithiophosphate) (DIOXATHION)
2-Methoxy-4-H-1,3,2-benzodioxaphosphorine-2-sulphide
0,0-Diethyl-0-(5-phenyl-3-isooxyzolyl(sic)) thiophosphate
S-[(6-Chlor-2-oxo-3-benzoxazolinyl)methyl]0,0-diethyldithiophosphate (PHOSALON)
2-(Diethoxyphosphinylimino)-4-methyl-2,3-dithiolane
0,0-Dimethyl-S-[2-methoxy-1,3,4-thiadiazol-5-(4H)-onyl-(4)-methyl]dithiophosphate
Tris-(2-methyl-1-aziridinyl)-phosphine-oxide (METEPA)
0,0-Dimethyl-S-phthalimidomethyl-dithiophosphate
S-(2-Chloro-1-phthalimidoethyl)-0,0-diethyldithiophosphate
N-Hydroxynaphthalimido-diethylphosphate
Dimethyl-3,5,6-trichloro-2-pyridylphosphate
0,0-Dimethyl-0-(3,5,6-trichloro-2-pyridyl)thiophosphate
0,0-Diethyl-0-(3,5,6-trichloro-2-pyridyl)thiophosphate
0,0-Diethyl-0-2-pyrazinylthiophosphate (THIONAZIN)
0,0-Diethyl-0-(2-quinoxylyl)thiophosphate
0,0-Dimethyl-S-(4-oxo-1,2,3-benzotriazin-3(4H)-ylmethyl)dithiophosphate (AZINPHOSMETHYL)
0,0-Diethyl-S-(4-oxo-1,2,3-benzotriazin-3(4H)-ylmethyl)dithiophosphate (AZINPHOSETHYL)
S-[(4,6-Diamino-s-triazin-2-yl)methyl]-0,0-dimethyldithiophosphate (MENAZON)
S-[2-(Ethylsulphonyl)ethyl]dimethylthiolphosphate (DIOXYDEMETON-S-METHYL)
Diethyl-S-[2-(ethylsulphinyl)ethyl]dithiophosphate (OXYDISULFOTON)
Bis-0,0-diethylthiophosphoric acid anhydride (SULFOTEP)
Dimethyl-1,3-di(carbomethoxy)-1-propen-2-yl-phosphate
Dimethyl-(2,2,2-trichloro-1-butyroyloxyethyl)phosphonate (BUTONAT)
0,0-Dimethyl-0-(2,2-dichloro-1-methoxy-vinyl)phosphate O,O-Dimethyl-O-(3-chloro-4-nitrophenyl)thiophosphate (CHLORTHION)
O,O-Dimethyl-O(or S)-2-(ethylthioethyl)thiophosphate (DEMETON-S-METHYL)
Bis-(dimethylamido)fluorophosphate (DIMEFOX)
2-(O,O-Dimethyl-phosphoryl-thiomethyl)-5-methoxy-pyrone-4
3,4-Dichlorobenzyl-triphenylphosphonium chloride
Dimethyl-N-methoxymethylcarbamoylmethyl-dithiophosphate (FORMOCARBAM)
O,O-Diethyl-O-(2,2-dichloro-1-chlorethoxyvinyl)-phosphate
O,O-Dimethyl-O-(2,2-dichloro-1-chloroethoxyvinyl)-phosphate
O-Ethyl-S,S-diphenyldithiolphosphate
O-Ethyl-S-benzyl-phenyldithiophosphonate
O,O-Diethyl-S-benzyl-thiolphosphate
O,O-Dimethyl-S-(4-chlorophenylthiomethyl)dithiophosphate (METHYLCARBOPHENOTHION)
O,O-Dimethyl-S-(ethylthiomethyl)dithiophosphate
Diisopropylaminofluorophosphate (MIPAFOX)
O,O-Dimethyl-S-(morpholinylcarbamoylmethyl)dithiophosphate (MORPHOTHION)
Bismethylamide-phenylphosphate
O,O-Dimethyl-S-(benzenesulphonyl)dithiophosphate
O,O-Dimethyl-(S and O)-ethylsulphinylethylthiophosphate
O,O-Diethyl-O-4-nitrophenylphosphate
O,O-Diethyl-S-(2,5-dichlorophenylthiomethyl)dithiophosphate (PHENDAPTON)
Triethoxy-isopropoxy-bis(thiophosphinyl)disulphide
O,O-Diethyl-O-(4-methyl-coumarinyl-7)-thiophosphate (POTASAN)
2-Methoxy-4H-1,3,2-benzodioxaphosphorine-2-oxide
Octamethylpyrophosphoramide (SCHRADAN)
Bis(dimethyoxythiophosphinylsulphido)-phenylmethane
5-Amino-bis(dimethylamido)phosphinyl-3-phenyl-1,2,4-triazole (TRIAMIPHOS)
N-Methyl-5-(O,O-dimethylthiolphosphoryl)-3-thiavaleramide (VAMIDOTHION) and
N,N,N',N'-Tetramethyldiamidofluorophosphate (DIMEFOX)

CARBAMIC ACID DERIVATIVES

1-Naphthyl-N-methylcarbamate (CARBARYL)
2-Butinyl-4-chlorophenylcarbamate
4-Dimethylamino-3,5-xylyl-N-methylcarbamate
4-Dimethylamino-3-tolyl-N-methylcarbamate (AMINOCARB)
3,4,5-Trimethylphenyl-N-methylcarbamate
2-Chlorophenyl-N-methylcarbamate (CPMC)
5-Chlor-6-oxo-2-norbornane-carbonitrile-O-(methylcarbamoyl)-oxime
1-(Dimethylcarbamoyl)-5-methyl-3-pyrazolyl-N,N-dimethylcarbamate (DIMETILAN)
2,3-Dihydro-2,2-dimethyl-7-benzofuranyl-N-methylcarbamate (CARBOFURAN)
2-Methyl-2-methylthio-propionaldehyde-0-(methylcarbamoyl)oxime (ALDICARB)
8-Quinaldyl-N-methylcarbamate and its salts
Methyl 2-isopropyl-4-(methylcarbamoyloxy)carbanilate
m-(1-Ethylpropyl)phenyl-N-methylcarbamate
3,5-Di-tert.butyl-N-methylcarbamate
m-(1-Methylbutyl)phenyl-N-methylcarbamate
2-Isopropylphenyl-N-methylcarbamate
2-sec.Butylphenyl-N-methylcarbamate
m-Tolyl-N-methylcarbamate
2,3-Xylyl-N-methylcarbamate
3-Isopropylphenyl-N-methylcarbamate
3-tert.Butylphenyl-N-methylcarbamate
3-sec.-Butylphenyl-N-methylcarbamate
3-Isopropyl-5-methylphenyl-N-methylcarbamate (PROMECARB)
3,5-Diisopropylphenyl-N-methylcarbamate
2-Chlor-5-isopropylphenyl-N-methylcarbamate
2-Chloro-4,5-dimethylphenyl-N-methylcarbamate
2-(1,3-Dioxolan-2-yl)phenyl-N-methylcarbamate (DIOXYCARB)
2-(4,5-Dimethyl-1,3-dioxolan-2-yl)phenyl-N-methylcarbamate
2-(1,3-Dioxan-2-yl)phenyl-N-methylcarbamate
2-(1,3-Dithiolan-2-yl)phenyl-N-methylcarbamate
2-(1,3-Dithiolan-2-yl)phenyl-N,N-dimethylcarbamate
2-Isopropoxyphenyl-N-methylcarbamate (ARPROCARB)
2-(2-Propinyloxy)phenyl-N-methylcarbamate
2-(2-Propinyloxy)phenyl-N-methylcarbamate
3-(2-Propinyloxy)phenyl-N-methylcarbamate
2-Dimethylaminophenyl-N-methylcarbamate
2-Diallylaminophenyl-N-methylcarbamate
4-Diallylamino-3,5-xylyl-N-methylcarbamate (ALLYXICARB)
4-Benzothienyl-N-methylcarbamate
2,3-Dihydro-2-methyl-7-benzofuranyl-N-methylcarbamate
3-Methyl-1-phenylpyrazol-5-yl-N,N-dimethylcarbamate
1-Isopropyl-3-methylpyrazol-5-yl-N,N-dimethylcarbamate (ISOLAN)
2(N',N'-Dimethylcarbamoyl)-3-methylpyrazol-5-yl-N,N-dimethylcarbamate
2-Dimethylamino-5,6-dimethylpyrimidin-4-yl-N,N-dimethylcarbamate
3-Methyl-4-dimethylaminomethyleneiminophenyl-N-methylcarbamate
3-Dimethylamino-methyleneiminophenyl-N-methylcarbamate
1-Methylthio-ethylimino-N-methylcarbamate (METHOXYMYL)
2-Methylcarbamoyloxyimino-1,3-dithiolane
5-Methyl-2-methylcarbamoyloxyimino-1,3-oxathiolane
2-(1-Methoxy-2-propoxy)phenyl-N-methylcarbamate
2-(1-Butin-3-yl-oxy)phenyl-N-methylcarbamate
3-Methyl-4-(dimethylamino-methylmercapto-methyleneimino)phenyl-N-methylcarbamate
1,3-Bis(carbamoylthio)-2-(N,N-dimethylamino)-propane hydrochloride
5,5-Dimethylhydroresorcinoldimethylcarbamate
2-[Propargylethylamino]-phenyl-N-methylcarbamate
2-[Propargylmethylamino]-phenyl-N-methylcarbamate
2-[Dipropargylamino]-phenyl-N-methylcarbamate 3-Methyl-4-[dipropargylamino]-phenyl-N-methylcarbamate
3,5-Dimethyl-4-[dipropargylamino]-phenyl-N-methylcarbamate
2-[Allyl-isopropylamino]-phenyl-N-methylcarbamate and
3-[Allyl-isopropylamino]-phenyl-N-methylcarbamate.

CHLORINATED HYDROCARBONS

γ-Hexachlorocyclohexane [Gammerxane;Lindane; γHCH]
1,2,4,5,6,7,8,8-Octachloro-3α,4,7,7α'-tetrahydro-4,7-methyleneindane [Chlordan]
1,4,5,6,7,8,8-Heptachloro-3α,4,7,7α-tetrahydro-4,7-methyleneindane [Heptachlor]
1,2,3,4,10,10-Hexachloro-1,4,4α,5,8,8α-hexahydro-endo-1,4-exo-5,8-dimethanonaphthalene [Aldrin]
1,2,3,4,10,10-Hexachloro-6,7-epoxy-1,4,4α,5,6,7,8,8α-octahydro-exo-1,4-endo-5,8-dimethanonaphthalene [Dieldrin]
ditto, endo-endo- [Endrin]
6,7,8,9,10,10-Hexachloro-1,5,5α,6,9,9α-hexahydro-6,9-methano-2,3,4 benzo[c]-dioxa-thiepene-3-oxide [Endosulfan]
Chlorinated camphor [Toxaphen]
Decachloroctahydro-1,3,4-metheno-2H-cyclobuta[cd] pentalen-2-one
Dodecachloroctahydro-1,3,4-metheno-1H-cyclobuta[c d]pentalene [Mirex]
Ethyl-1,1α,3,3α,4,5,5,5α,6-decachloroctahydro-2-hydroxy-1,3,4-metheno-1H-cyclcobuta[c d]pentalene-2- laevulinate
Bis(pentachloro-2,4-cyclopentadien-1-yl)
Dinoctone
1,1,1-Trichloro-2,2-bis(p-chlorophenyl)ethane [DDT]
Dichlorodiphenyl-dichloroethane [TDE]
Di(p-chlorophenyl)-trichloromethylcarbinol [Dicofol]
Ethyl-4,4'-dichlorophenylglycollate [Chlorobenzylate]
Ethyl-4,4'-dibromobenzylate [Bromobenzylate]
Isopropyl-4,4'-dichlorobenzylate
1,1,1-Trichloro-2,2 bis(p-methoxyphenyl)ethane [Methoxychlor]
Diethyl-diphenyl-dichloroethane
Decachloropentacyclo(3,3,2, $0^{2,6}$, $0^{3,9}$, $0^{7,10}$)decan-4-one [Chlordecon].

NITROPHENOLS AND DERIVATIVES 4,6-Dinitro-6-methylphenol Na salt [dinitrocresol]
Dinitrobutylphenol-2,2',2''-triethanolamine salt
2-Cyclohexyl-4,6-dinitrophenol [Dinex]
2-(1-Methylheptyl)-4,6-dinitrophenyl-crotonate [Dinocap]
2 sec.-Butyl-4,6-dinitrophenyl-3-methyl-butenoate [Binapacryl]
2 sec.-Butyl-4,6-dinitrophenyl-cyclopropionate and
2 sec.-Butyl-4,6-dinitrophenyl-isopropyl-carbonate [Dinobuton]

VARIOUS SUBSTANCES

Sabadilla
Rotenone
Cevadine
Veratridine
Ryania
Pyrethrin
3-Allyl-2-methyl-4-oxo-2-cyclopenten-1-yl-chrysanthemumate (Allethrin)
6-Chloropiperonyl-chrysanthemumate (Barthrin)
2,4-Dimethylbenzyl-chrysanthemumate (Dimethrin)
2,3,4,5-Tetrahydrophthalimidomethyl-chrysanthemumate
(5-Benzyl-3-furyl)-methyl-2,2-dimethyl-3-(2-methylpropanyl) cyclopropanecarboxylate
Nicotine
Bacillus thuringiensis Berliner
Dicyclohexylcarbodiimide
Diphenyldiimide [azobenzene (sic)]
4-Chlorobenzyl-4-chlorophenylsulphide [Chlorobenside]
Creosote oil
6-Methyl-2-oxo-1,3-dithiolo-[4,5-b]-quinoxaline [Quinomethionate]
(I)-3-(2-Furfuryl)-2-methyl-4-oxocyclopent-2-enyl(I)-(cistrans)chrysanthemum-monocarboxylate [Furethrin]
2-Pivaloyl-indane-1,3dione [Pindon]
2-Fluorethyl(4-bisphenyl)acetate
2-Fluoro-N-methyl-N(1-naphthyl)-acetamide
Pentachlorophenol and salts
2,2,2-Trichloro-N-(pentachlorophenyl)-acetimidoyl chloride
N'-(4-Chloro-2-methylphenyl)-N,N-dimethylformamidine (Chlorphenamidine)
4-Chlorobenzyl-4-fluorophenyl-sulphide (Fluorobenside)
5,6-Dichloro-1-phenoxycarbanyl-2-trifluoromethyl-benzimidazole (Fenosaflor)
Tricyclohexyl-stannic-hydroxide
2-Thiocyanatoethyl-lauric acid ester
β-Butoxy-β'-thiocyanatodiethyl-ether
Isobornyl-thiocyanatoacetate
p-Chlorophenyl-p-chlorobenzenesulphonate (Ovex)
2,4-Dichlorophenyl-benzenesulphonate
p-Chlorophenyl-benzenesulphonate (Fenson)
p-Chlorophenyl-2,4,5-trichlorophenylsulphone (Tetradifon)
p-Chlorophenyl-2,4,5-trichlorophenylsulphide (Tetrasul)
Methyl bromide
p-Chlorophenyl-phenylsulphone
p-Chlorobenzyl-p-chlorophenylsulphide (Chlorobenside)
4-Chlorophenyl-2,4,5-trichlorophenylazosulphide
2(p-tert.-Butylphenoxy)-1-methylethyl-2-chloroethyl-sulphite
2(p-tert.-Butylphenoxy)cyclohexyl-2-propinyl-sulphite
4,4'-Dichloro-N-methylbenzenesulphonanilide
N-(2-Fluoro-1,1,2,2-tetrachloroethylthio)-methanesulphonanilide
2-Thio-1,3-dithiolo-(4,5-6)quinoxaline (Thioquinox)
Chloromethyl-p-chlorophenylsulphone (lauseto (sic!) new)
1,3,6,8-Tetranitrocarbazole and
Prop-2-ynyl-(4-t-butylphenoxy)-cyclohexylsulphite (Propargil).

The ratio of the insecticidally and/or acaricidally active substance to the compounds of the formula I is preferably within the range of from 0.01 : 10 to 200 : 1.

Such synergistically active mixtures can preferentially be employed against all harmful insects, for example against aphids, such as the green peach aphid (*Myzus persicae*), and the black bean aphid (*Doralis fabae*); scale insects lice such as *Aspidiotus hederae, Lecanium hesperidium, Pseudococcus maritimus*; Thysanoptera such as *Hercinothrios femoralis*, and bugs such as the beet bug (*Piesma quadrata*) or the bed bug (*Cimex lectularius*), caterpillars, such as *Plutella maculipennis* and *Lymantria dispar*; weevils such as the granary weevil (*Calandra granaria*) or the Colorado beetle (*Leptinotarsa decemlineata*), but also varieties which live in soil, such as wireworms (Agriotes sp.) or cockchafer grubs (*Melolontha melolontha*); cockroaches, such as the German cockroach (*Blattella germanica*); Orthoptera, such as the cricket (*Gryllus domesticus*); termites, such as Beticulitermes; Hymenoptera, such as ants; Diptera, such as the vinegar fly (*Drosophila melanogaster*), the Mediterranean fruit fly (*Ceratitis capitata*), the housefly (*Musca domestica*), and gnats, such as the yellow fever mosquito (*Aedes aegypti*).

The use of this synergistic mixture is also especially effective in combatting representatives of the order Acarina such as for example Eulaelaps, Echinolaelaps, Laelaps, Haemogamasus, Dermanyssus, Ornithonyssus, Allodermanyssus, in particular *Allodermanyssus sanguineus, Pneumonyssus, Amblyomma, Aponomma, Boophilus, Dermacenter, Haemophysalis, Hyalomma, Ixodes, Margaropus, Rhipicephalus, Ornithodorus; Otobius, Cheyletidae*, for example *Cheyletus, Psorergates, Demodicidae, Trombiculidae*, for example *Trombicula, Eutrombicula, Schongastia, Acomatacurus, Neoschongastia, Euschongastia, Sarcoptiformes* for example *Notoedres, Sarcoptes, Knemidokoptes, Psaroptidae*, for example *Psoroptes, Chorioptes, otodectes or Tetranychidae*, for example *Tetranychus telarius; Tetranychus urticae* and the like.

The mixtures can either be used by themselves or together with suitable carriers and/or additives.

Suitable carriers and additives can be solid or liquid and correspond to the substances which are customary in formulation technology, for example, natural or regenerated mineral substances, solvents, dispersing agents, wetting agents, adhesives, thickeners, binders or fertilisers.

Such preparations can be employed in the form of solutions, emulsions, suspensions, granules or dusting agents. The methods of application depend on the end uses and must ensure that the active substance can be finely distributed.

The content of active substance in the preparations described above is between 0.1 and 95%. At the same time it should be mentioned that in the case of application from aircraft or by means of other suitable application instruments, concentrations of up to 99.5% or even a pure active substance may be employed.

To manufacture solutions, it is possible to employ solvents, especially alcohols, for example ethyl alcohol or isopropyl alcohol, ketones, such as acetone or cyclohexanone, aliphatic hydrocarbons, such as kerosene, and cyclic hydrocarbons, such as benzene, toluene, xylene, tetrahydronaphthalene and alkylated naphthalenes, and also chlorinated hydrocarbons, such as tetrachloroethane, ethylene chloride, and finally also mineral and vegetable oils or mixtures of the above mentioned substances.

Aqueous preparations are preferably dispersions. The compounds of formula (I) and the active substance, as such or in one of the abovementioned solvents, are homogenised in water, preferably by means of wetting agents or dispersing agents. Amongst cationic dispersing agents, quaternary ammonium compounds may be mentioned as an example, and amongst anionic dispersing agents, soaps, aliphatic long-chain sulphuric acid monoesters, aliphatic-aromatic sulphonic acids and long-chain alkoxyacetic acids may for example be mentioned; amongst non-ionic dispersing agents, polyglycol ethers of fatty alcohols or ethylene oxide condensation products with p-tert. alkylphenols may be mentioned. On the other hand, it is also possible to manufacture concentrates consisting of active substance, synergistic agent or dispersing agent and optionally solvents. Such concentrates can be diluted before use, for example with water.

Dusting agents can be manufactured by mixing or conjoint grinding of the active substance and the synergistic agent with a solid carrier. Possible carriers are for example: talc, diatomaceous earth, kaolin, bentonite, calcium carbonate, boric acid or tricalcium phosphate, but also wood flour, cork powder, charcoal and other materials of vegetable origin. The substances can also be absorbed on the carriers by means of a volatile solvent. Pulverulent preparations and pastes can be rendered capable of suspension in water, and usable as spraying agents, by the addition of wetting agents and protective colloids.

In many cases the use of granules for uniformly releasing the active substance-synergistic agent combinations over a longer period of time is of advantage. These granules can be manufactured by dissolving the active substance in an organic solvent, absorbing this solution by a granular mineral, for example attapulgite or SiO$_2$, and removing the solvent. They can also be manufactured by mixing the active substances of formula I with polymerisable compounds, after which a polymerisation is carried out which leaves the active substances unaffected, with the granulation being carried out whilst the polymerisation is still proceeding.

The following Examples illustrate the invention.

EXAMPLE 1

Manufacture of N-o-nitrophenylpropargyl-carbamate 41 g of o-nitrophenylisocyanate in 75 ml of dimethylformamide were added dropwise to 14 g of propargyl alcohol in 75 ml of dimethylformamide, at 25°C, whilst cooling. The reaction mixture was stirred at room temperature for approx. 10 to 12 hours and subsequently poured into ice water. The crystals of the compound of formula

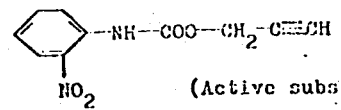

(Active substance No. 1)

which precipitated were recrystallized from benzene/petroleum ether. Melting point 77°–79°C.

The following compounds of formula

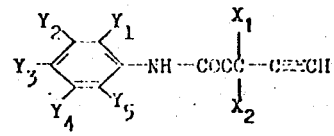

were also manufactured analogously:

| Active substance No. | $Y_1$ | $Y_2$ | $Y_3$ | $Y_4$ | $Y_5$ | $X_1$ | $X_2$ | Melting point/ Boiling point °C |
|---|---|---|---|---|---|---|---|---|
| 2 | Br | H | H | H | H | H | H | 58–59° |
| 3 | H | Br | H | H | H | H | H | 58–59° |
| 4 | H | H | Br | H | H | H | H | 144–145° |
| 5 | H | H | Br | H | H | $CH_3$ | H | 114–116° |
| 6 | Cl | H | H | H | H | H | H | 45° |
| 7 | H | H | Cl | H | H | H | H | 49° |
| 8 | H | H | Cl | H | H | $CH_3$ | H | 100–102° |
| 9 | Cl | Cl | H | H | H | H | H | 72–73° |
| 10 | Cl | Cl | H | H | H | $CH_3$ | H | 75–76° |
| 11 | Cl | Cl | H | H | H | $CH_3$ | $CH_3$ | 83–85° |
| 12 | Cl | H | H | Cl | H | H | H | 71–73° |
| 13 | Cl | H | H | Cl | H | $CH_3$ | H | 87–88° |
| 14 | Cl | H | H | Cl | H | $CH_3$ | $CH_3$ | 102–104° |
| 15 | H | Cl | H | Cl | H | H | H | 111–113° |
| 16 | H | Cl | H | Cl | H | $CH_3$ | $CH_3$ | 104–106° |
| 17 | H | Cl | Cl | H | H | H | H | 78–80° |
| 18 | H | Cl | Cl | H | H | $CH_3$ | H | 84–85° |
| 19 | H | Cl | Cl | H | H | $CH_3$ | $CH_3$ | 111–112° |
| 20 | Cl | H | Cl | Cl | H | H | H | 101–103° |
| 21 | H | $CF_3$ | Cl | H | H | H | H | 77–79° |
| 22 | H | $CF_3$ | Cl | H | H | $CH_3$ | $CH_3$ | 103–105° |
| 23 | H | H | $NO_2$ | H | H | H | H | 174–177° |
| 24 | $NO_2$ | H | Cl | H | H | H | H | 84–87° |
| 25 | $NO_2$ | H | H | Cl | H | H | H | 62–64° |
| 26 | $OCH_3$ | H | H | H | H | H | H | 65–66° |
| 27 | $CH_3$ | H | SCN | $CH_3$ | H | H | H | 109–111° |
| 28 | H | $CH_3$ | SCN | H | H | H | H | 92–93° |
| 29 | H | $CF_3$ | $OCH_3$ | H | H | H | H | 78–81° |
| 30 | H | H | H | H | H | H | H | 92–94° |
| 31 | H | Cl | H | H | H | $CH_3$ | $CH_3$ | 88–93° |
| 32 | Cl | H | H | H | H | $CH_3$ | $CH_3$ | 47–50° |
| 33 | H | H | H | H | H | $CH_3$ | $CH_3$ | 102–103° |
| 34 | H | H | Cl | H | H | $CH_3$ | $CH_3$ | 117–119° |
| 35 | H | Cl | H | H | H | $CH_3$ | $C_2H_5$ | 68–72° |
| 36 | Cl | H | H | H | H | $CH_3$ | $C_2H_5$ | 108–111° 0.06 mm Hg |
| 37 | H | H | Cl | H | H | $CH_3$ | $C_2H_5$ | 63–65° |
| 38 | H | $CF_3$ | H | H | H | $CH_3$ | $C_2H_5$ | 57–58° |
| 39 | H | H | H | H | H | $CH_3$ | $C_2H_5$ | 68–69° |
| 40 | H | $CF_3$ | H | $CF_3$ | H | H | H | 30–35° |
| 41 | H | $CF_3$ | H | $CF_3$ | H | $CH_3$ | $CH_3$ | 128–130° |
| 42 | H | H | $CF_3$ | H | H | H | H | 98–99° |
| 43 | H | H | $CF_3$ | H | H | $CH_3$ | H | 75–78° |
| 44 | H | H | $CF_3$ | H | H | $CH_3$ | $CH_3$ | 107–109° |
| 45 | H | $CF_3$ | H | H | H | H | Oil | |
| 46 | H | $CF_3$ | H | H | H | $CH_3$ | $CH_3$ | 84–85° |
| 47 | H | H | Br | H | H | $CH_3$ | $CH_3$ | 115–117° |
| 48 | H | H | $CH_3$ | H | H | H | H | 88–90° |
| 49 | H | $CH_3$ | H | H | H | H | H | 52–54° |
| 50 | H | $CH_3$ | H | H | H | $CH_3$ | $CH_3$ | 47–48.5° |
| 51 | $CH_3$ | H | H | H | H | H | H | 42–44° |
| 52 | $CH_3$ | H | H | H | H | $CH_3$ | $CH_3$ | 90–92° |
| 53 | H | H | F | H | H | H | H | 98–90° |
| 54 | $CH_3$ | H | Cl | H | H | H | H | 79–80° |
| 55 | $CH_3$ | Cl | H | H | H | H | H | 97–98° |
| 56 | $CH_3$ | Cl | H | H | H | $CH_3$ | $CH_3$ | 125–127° |
| 57 | $CH_3$ | H | H | $CH_3$ | H | H | H | 105–107° |
| 58 | $CH_3$ | H | $CH_3$ | H | H | H | H | 79–80° |
| 59 | $CH_3$ | H | $CH_3$ | H | H | $CH_3$ | H | 73–75° |
| 60 | $OCH_3$ | H | $OCH_3$ | Cl | H | H | H | 109–111° |
| 61 | $OCH_3$ | H | H | Cl | H | H | H | 93–95° |
| 62 | F | H | H | H | H | H | H | Oil |
| 63 | H | Cl | H | H | H | H | H | 46–47° |
| 64 | H | Cl | H | H | H | $CH_3$ | H | Oil |
| 65 | $OCH_3$ | H | $NO_2$ | H | H | H | H | 146–148° |
| 66 | $CH_3$ | H | $NO_2$ | Cl | H | H | H | 135–138° |
| 67 | $CH_3$ | $CH_3$ | H | H | H | H | H | 68–69° |
| 68 | $CH_3$ | $CH_3$ | H | H | H | $CH_3$ | H | 72–73° |
| 69 | $CH_3$ | $CH_3$ | H | H | H | $CH_3$ | $CH_3$ | 104–106° |
| 70 | H | Cl | $OCH_3$ | H | H | H | H | 79–80° |
| 71 | $OCH_3$ | H | Cl | $OCH_3$ | H | H | H | 108–109° |
| 72 | $OCH_3$ | H | $OCH_3$ | H | H | H | H | 58–60° |
| 73 | $OCH_3$ | H | H | $OCH_3$ | H | H | H | 55° |
| 74 | $CH_3$ | H | H | Cl | H | H | H | 81–82° |
| 75 | $CH_3$ | H | H | H | $CH_3$ | H | H | 103–104° |
| 76 | $CH_3$ | H | H | H | $CH_3$ | $CH_3$ | H | 83–85° |
| 77 | $CH_3$ | H | H | H | $CH_3$ | $CH_3$ | $CH_3$ | 106–108° |
| 78 | Cl | H | H | $CF_3$ | H | H | H | 57–58° |
| 79 | H | Cl | $CF_3$ | H | H | H | H | Oil |
| 80 | H | Cl | $CF_3$ | H | H | $CH_3$ | H | 82–84° |
| 81 | H | Cl | $CF_3$ | H | H | $CH_3$ | H | 98–99° |
| 82 | H | Cl | $CH_3$ | H | H | H | H | 83–85° |
| 83 | H | Cl | $CH_3$ | H | H | $CH_3$ | H | 60–62° |
| 84 | H | Cl | $CH_3$ | H | H | $CH_3$ | $CH_3$ | 86–87° |
| 85 | H | Br | $OCH_3$ | Br | H | H | H | 115–116° |

EXAMPLE 2

Dusting Agents

Equal parts of a mixture of active substance and synergistic agent and of precipitated silica are finely ground. Dusting agents, preferably containinig 1-6 % of active substance, can be manufactured therefrom by mixing with kaolin or talc.

Spraying Powder

To manufacture a spraying powder, the following components are for example mixed and finely ground:
50 parts of a mixture of active substance and synergistic agent
20 parts of highly adsorbent silica
25 parts of Bolus alba (Kaolin)
1.5 parts of sodium 1-benzyl-2-stearyl-benzimidazole-6,3'-disulphonate and
3.5 parts of a reaction product of p-tert. octylphenol and ethylene oxide.

Emulsion Concentrate

The easily soluble mixture of active substance and synergistic agent can also be formulated as an emulsion concentrate in accordance with the following instruction:
20 parts of a mixture of active substance and synergistic agent,
70 parts of xylene and
10 parts of a mixture of a reaction product of an alkyl phenol with ethylene oxide and calcium dodecylbenzenesulphonate are mixed. On dilution with water to the desired concentration, a sprayable emulsion results.

Granules 7.5 g of a mixture of active substance and synergistic agent are dissolved in 100 ml of acetone and the acetone solution thus obtained is added to 92 g of granular attapulgite. The whole is well mixed and the solvent is stripped off in a rotary evaporator. Granules containing 7.5 % of active substance are obtained.

EXAMPLE 3

Test for Synergistic Action

For this test, female house flies aged from 2 to 5 days were used. Before the start of the test, the flies were sorted as to gender under $CO_2$ narcosis, and the females were placed in groups of 10. The flies, which were kept motionless with $CO_2$, were treated with a dispenser which on pressing the button each time releases 1 microlitre of the solution of the test substance in acetone. After the treatment, the flies were placed in groups of 10 in Petri dishes into which a cottonwool pad impregnated with honey water had been introduced for the flies to feed on. After 24 hours the test was evaluated by counting the flies which could no longer move. The results quoted in the table represent average values for the percentage destruction from four repeat tests.

The following were each used per fly (weight of one fly 20 mg (average value)):
a. 0.08γ of each of the compounds Nos. 1, 2, 3, 6, 7, 9, 12, 15, 20, 45, 49, 53, 55, 57 and 78
b. 0.08γ of the compound of formula

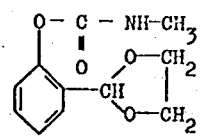

c. 0.08γ of compound (A) and 0.08γ of compounds Nos. 1, 2, 3, 6, 7, 9, 12, 15, 20, 45, 49, 53, 55, 57 and 78.

| Compound No. | 0.087γ of synergistic agent | 0.08γ of (A) | 0.08γ of A and 0.08γ of synergistic agent |
| --- | --- | --- | --- |
| 1 | 0 | 17 | 92 |
| 2 | 0 | 17 | 65 |
| 3 | 0 | 17 | 50 |
| 6 | 0 | 17 | 90 |
| 7 | 0 | 17 | 40 |
| 9 | 0 | 17 | 95 |
| 12 | 0 | 17 | 95 |
| 15 | 0 | 17 | 45 |
| 20 | 0 | 17 | 60 |
| 45 | 0 | 17 | 80 |
| 49 | 0 | 17 | 65 |
| 53 | 0 | 17 | 65 |
| 55 | 0 | 17 | 90 |
| 57 | 0 | 17 | 45 |
| 78 | 0 | 17 | 75 |

EXAMPLE 4

A test of the synergistic action of the compound No. 1 on the compounds of formulae

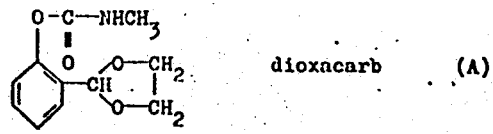

dioxacarb (A)

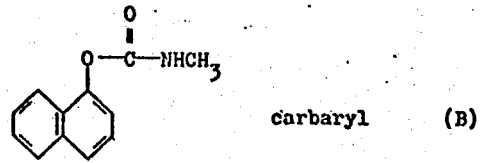

carbaryl (B)

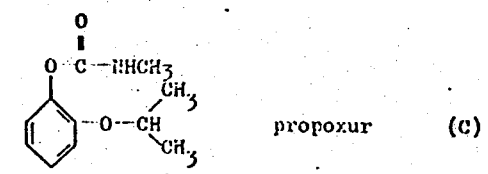

propoxur (C)

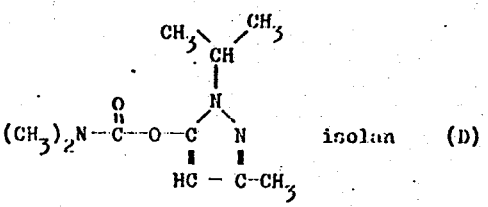

isolan (D)

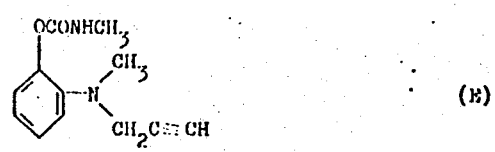

(E)

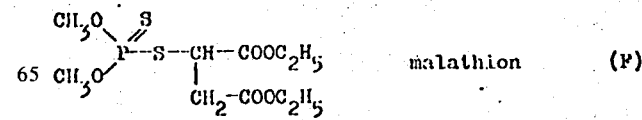

malathion (F)

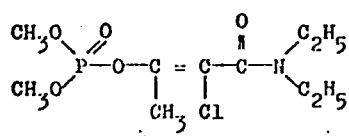 phosphamidon (G)

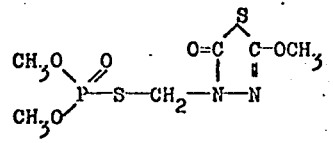 methidathion (H)

pyrethrum (I)

was carried out analogously to example 3.

The results listed in the table represent average values of the percentage destruction of female house flies, from two repeat experiments.

| | | | |
|---|---|---|---|
| a) | 0.32γ | Compound No. 1 | 0 |
| | 0.32γ | (A) | 5 |
| | 0.32γ | Compound No. 1+ | |
| | 0.32γ | (A) | 84 |
| b) | 0.08γ | Compound No. 1 | 0 |
| | 0.08γ | (B) | 5 |
| | 0.08γ | Compound No. 1+ | |
| | 0.08γ | (B) | 95 |
| c) | 0.1γ | Compound No. 1 | 0 |
| | 0.1γ | (C) | 3 |
| | 0.1γ | Compound No. 1+ | |
| | 0.1γ | (C) | 80 |
| d) | 0.2γ | Compound No. 1 | 0 |
| | 0.2γ | (D) | 10 |
| | 0.2γ | Compound No. 1+ | |
| | 0.2γ | (D) | 99 |
| e) | 0.08γ | Compound No. 1 | 0 |
| | 0.08γ | (E) | 15 |
| | 0.08γ | Compound No. 1+ | |
| | 0.08γ | (E) | 88 |
| f) | 0.6γ | Compound No. 1 | 0 |
| | 0.6γ | (F) | 15 |
| | 0.6γ | Compound No. 1+ | |
| | 0.6γ | (F) | 73 |
| g) | 0.1γ | Compound No. 1 | 0 |
| | 0.1γ | (G) | 3 |
| | 0.1γ | Compound No. 1+ | |
| | 0.1γ | (G) | 78 |
| h) | 0.1γ | Compound No. 1 | 0 |
| | 0.1γ | (H) | 15 |
| | 0.1γ | Compound No. 1+ | |
| | 0.1γ | (H) | 99 |
| i) | 0.07γ | Compound No. 1 | 0 |
| | 0.07γ | (I) | 10 |
| | 0.07γ | Compound No. 1+ | |
| | 0.07γ | (I) | 29 |

We claim:
1. The compound of the formula

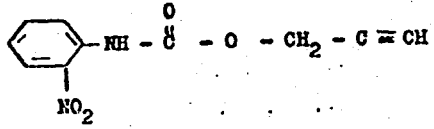

* * * * *